(12) United States Patent
Hietaniemi et al.

(10) Patent No.: US 11,447,618 B2
(45) Date of Patent: Sep. 20, 2022

(54) POLYMER COMPOSITION, ITS USE AND A SURFACE SIZE

(71) Applicant: Kemira Oyj, Helsinki (FI)

(72) Inventors: Matti Hietaniemi, Espoo (FI); Asko Karppi, Turku (FI); Rosa Carceller, Espoo (FI)

(73) Assignee: Kemira Oyj, Helsinki (FI)

( * ) Notice: Subject to any disclaimer, the term of this patent is extended or adjusted under 35 U.S.C. 154(b) by 1066 days.

(21) Appl. No.: 16/078,140

(22) PCT Filed: Feb. 28, 2017

(86) PCT No.: PCT/FI2017/050129
§ 371 (c)(1),
(2) Date: Aug. 21, 2018

(87) PCT Pub. No.: WO2017/149200
PCT Pub. Date: Sep. 8, 2017

(65) Prior Publication Data
US 2021/0189101 A1   Jun. 24, 2021

(30) Foreign Application Priority Data
Mar. 1, 2016 (FI) ...................................... 20165162

(51) Int. Cl.
| | | |
|---|---|---|
| C08L 3/02 | (2006.01) | |
| C08F 2/10 | (2006.01) | |
| C08F 220/56 | (2006.01) | |
| C08K 5/092 | (2006.01) | |
| D21H 21/16 | (2006.01) | |

(52) U.S. Cl.
CPC ................. *C08L 3/02* (2013.01); *C08F 2/10* (2013.01); *C08F 220/56* (2013.01); *C08K 5/092* (2013.01); *D21H 21/16* (2013.01)

(58) Field of Classification Search
CPC ......... C08L 3/02; D21H 21/16; C08F 251/00; C08F 2/10; C08F 220/56; C08F 220/06; C08F 222/385; C08K 5/092

USPC ...................................................... 162/164.1
See application file for complete search history.

(56) References Cited

U.S. PATENT DOCUMENTS

| | | |
|---|---|---|
| 3,785,921 A | 1/1974 | Ide et al. |
| 4,115,332 A | 9/1978 | Young et al. |
| 4,575,528 A | 3/1986 | Van Eenam |
| 6,034,181 A | 3/2000 | Bazaj et al. |
| 2003/0188840 A1 | 10/2003 | Van Handel et al. |
| 2004/0149412 A1 | 8/2004 | Tammi et al. |
| 2005/0176878 A1 | 8/2005 | Ettl et al. |
| 2006/0260774 A1 | 11/2006 | Rodriguez et al. |
| 2009/0139675 A1 | 6/2009 | Stein et al. |
| 2010/0324178 A1 | 12/2010 | Brockmeyer et al. |

FOREIGN PATENT DOCUMENTS

| | | |
|---|---|---|
| CN | 101213216 A | 7/2008 |
| JP | H11241294 A | 9/1999 |
| RU | 2008386 C1 | 2/1994 |
| RU | 2521636 C2 | 8/2012 |
| WO | 2010011646 A2 | 1/2010 |

OTHER PUBLICATIONS

Finnish Patent Office, Search Report of FI20165162 dated Sep. 15, 2016.

*Primary Examiner* — Mark Halpern
(74) *Attorney, Agent, or Firm* — Meunier Carlin & Curfman LLC

(57) ABSTRACT

The invention relates to a water-soluble polymer composition obtained by polymerizing in an aqueous polymerisation medium, which comprises degraded starch, at least following monomers: acrylamide and/or methacrylamide, and >2 mol-% of at least one unsaturated mono- or dicarboxylic acid(s) or salts thereof. The polymer composition has an anionic net charge at pH 7 and a dry solids content of >5 weight-%. The invention relates also to the use of the polymer composition for surface sizing of paper, board or the like as well as to a surface size composition comprising it.

18 Claims, No Drawings

POLYMER COMPOSITION, ITS USE AND A SURFACE SIZE

PRIORITY

This application is a U.S. national application of the international application number PCT/FI2017/050129 filed on Feb. 28, 2017 and claiming priority of Finnish national application No. 20165162 filed on Mar. 1, 2016 the contents of all of which are incorporated herein by reference.

The present invention relates to a polymer composition, its use and a surface size composition according to the preambles of enclosed independent claims.

Cost efficiency is one important aspect when lower grades of paper or board are produced. Typical measures for obtaining cost efficiency are, for example, reduction of the basis weight of produced paper or board, increase of the filler content in the stock, as well as use of cheap fibre raw materials. However, many of these measures may have a negative impact on the properties of the obtained paper or board product, especially on the strength properties of the paper or board product.

Compression strength and burst strength are important strength properties for paper and board, especially for board grades, which are used for packaging. Compression strength is often measured and given as Short-span Compression Test (SCT) strength, which may be used to predict the compression resistance of the final product, e.g. cardboard box. Burst strength indicates paper's or board's resistance to rupturing, and it is defined as the hydrostatic pressure needed to burst a sample when the pressure is applied uniformly across the side of the sample. Both the compression strength and burst strength are negatively affected when the amount of inorganic mineral fillers and/or recycled fibres in the stock is increased.

Various properties of paper or board can be improved by surface sizing. For example, surface sizing can be used to increase hydrophobicity of the paper/board surface or to improve the strength properties of paper/board.

In conventional surface sizing the sizing solution is applied on the surface of the formed, at least partially dried fibre web. Typically surface size solutions comprise mainly starch, but they may also comprise synthetic polymers. The amount of synthetic polymer in the surface size solution has been limited by the increase of viscosity of the size solution. If the viscosity of the surface size solution becomes too high, it cannot be applied on the surface of the paper or board with present size applicators. Synthetic polymers are often also expensive, which make their use in low grade paper/board products uneconomical.

Consequently, there is a constant need and search for compositions, which are suitable for use in surface sizing and which can be used to increase the strength properties of the paper or board. Especially, there is a continuing need for novel cost-effective surface size alternatives for improving the strength properties of paper or board.

The object of the present invention is to minimize or even eliminate the disadvantages existing in the prior art.

One object of the present invention is to provide a water-soluble polymer composition, which is effectual in increasing the dry strength properties of paper, board or the like, when applied on its surface.

Another object of the present invention is to provide a surface size composition which is easy to apply and provides dry strength properties for paper, board or the like, when applied on its surface.

These objects are attained with the invention having the characteristics presented below in the characterising parts of the independent claims.

Some preferable embodiments of the invention are presented in the dependent claims. The features recited in the dependent claims are freely combinable with each other unless otherwise explicitly stated.

Typical water-soluble polymer composition according to the present invention is obtained by polymerizing in an aqueous polymerisation medium, which comprises degraded starch, at least following monomers
- acrylamide and/or methacrylamide, and
- >2 mol-% of at least one unsaturated mono- or dicarboxylic acid(s) or salts thereof,
the polymer composition having an anionic net charge at pH 7 and a dry solids content of >5 weight-%.

Typical use of a polymer composition according to the present invention is for surface sizing of paper, board or the like.

Typical surface size composition according to the present invention for application on a surface of paper, board or the like, comprises
- 0.5-10 weight-%, preferably 0.5-5 weight-%, more preferably 0.7-3 weight-%, of the polymer composition according to the present invention, and
- starch,
the surface size composition having a solids content of 0.5-25 weight-%.

The embodiments mentioned in this text relate, where applicable, to all aspects of the invention, i.e. both polymer composition, its use as well as the surface size composition, even if this is not always separately mentioned.

Now it has been surprisingly found that by polymerising acrylamide and/or methacrylamide with unsaturated mono- or dicarboxylic acid(s) in a medium comprising degraded starch, it is possible to obtain a polymer composition which provides several advantages when used in surface sizing of paper, board or the like. The polymer composition, which is obtained by the present invention, shows anionic net charge at pH 7 and is effective in increasing the dry strength properties, such as SCT strength and burst strength, when it is applied on the surface of the paper, board or the like. It is assumed that, without wishing to be bound by a theory, the polymerisation of the said monomers in the presence of starch creates a three-dimensional interpenetrating polymer network, where the formed copolymer of acrylamide is interlaced with the starch, but not necessarily covalently bound with it. The three-dimensional structure of the polymer composition as well as the charged groups improve interaction with the other components, such as fibres and/or fillers, existing on the surface of the paper or board web. The improved interaction of the polymer composition makes it possible to obtain the same improvement in strength properties by using smaller amounts of surface size composition or increase the strength properties by using the same amount of surface size composition as earlier.

Polymer composition according to the present invention is water-soluble. Monomers which are used for polymerisation of the polymer composition are also water-soluble. The term "water-soluble" is understood in the context of the present application that the polymer composition is fully miscible with water. When mixed with an excess of water, the polymer composition is preferably fully dissolved and the obtained polymer solution is preferably essentially free from discrete polymer particles or granules. Excess of water means that the obtained polymer solution is not a saturated solution. In order to determine water-solubility the following method may be used: 0.5 weight-% of dry polymer composition is mixed with 1500 ml of deionized water mixed with a magnetic stirrer for 60 min. NaCl is added to the sample solution, to obtain salt concentration of 5 weight-%, and mixed for further 5 minutes. Insoluble particles are measured using a stainless steel sieve with aperture 500 microns. The sieve is filled with 1500 ml of the aqueous sample and allowed to drain. The sieve is washed with 1000 ml of cold water. Total drainage time does not exceed 5 minutes. Gels and/or particles remaining on the sieve are visually counted. In one preferable embodiment water-soluble polymer composition means that there exists at most 500 insoluble particles/1500 ml, more preferably at most 50 insoluble particles/1500 ml.

In this application the viscosity values for polymer compositions in solution form or for dissolved polymer compositions are measured by using Brookfield DV1 viscometer, equipped with small sample adapter, at 25° C. Spindle SC4-18 is used for solution which has viscosity of 1000 mPas or less, and spindle SC4-31 is used for solution which has viscosity over 1000 mPas. Maximum rotation speed is used in the determination to get maximum torque value in each determination.

According to one embodiment of the present invention the polymer composition has an anionic net charge in the range of −0.5--−2.5 meq/g, preferably −0.7--−2.0 meq/g, more preferably −0.9--−1.6 meq/g, at pH 7, calculated as dry. This means that when the polymer composition is in form of an aqueous solution and the pH of the solution is adjusted to pH 7.0, the polymer composition has an anionic net charge. The net charge is calculated as the sum of the charges of the cationic and anionic groups, which are present in the polymer composition. In case of a dry polymer composition the polymer composition is first dissolved into water and the pH is adjusted to the defined level. Charge density is measured by using Mütek PCD-03 tester, titrator PCD-T3. It has been found that the defined charge density of the polymer composition provides an overall improvement in dry strength of the final paper or board product, especially in SCT strength and burst strength. The selected charge density also increases the bending stiffness of the final product as well as the obtained sizing effect. It has been observed that if the charge density is too low or too high, the properties are not improved in the desired manner.

The pH value of the obtained polymer composition in solution form may typically be in the range of 3.0-8.0, preferably in the range of 3.5-6.0. In case of the dry polymer the pH is determined by dissolving the polymer composition to water at 1 weight-% solids concentration. The pH range for the polymer composition is optimised in order to avoid degradation of starch at low pH values and to guarantee the necessary anionic nature of the polymer composition. If needed, the pH of the polymer composition may be adjusted to the desired level by addition of strong base, such as NaOH. The adjustment may be done during or after the polymerisation.

The polymer composition may be obtained by solution polymerisation or gel polymerisation.

The viscosity of the dissolved polymer composition, obtained either by solution polymerisation or gel polymerisation, is comparable to its average molecular weight. In order to obtain the desired strength effect in the surface sized paper or board product, the polymer composition preferably has a molecular weight inside certain limits, which can be defined by the viscosity of the dissolved polymer composition.

According to one preferable embodiment the polymer composition, prepared by solution polymerisation, has a viscosity in the range of 50-1500 mPas, preferably 60-400 mPas, more preferably 80-250 mPas, measured when dissolved to water at 10 weight-% solids concentration, at 25° C., pH 4, using Brookfield DV1 viscometer as described above.

According to another preferable embodiment the polymer composition, prepared by gel polymerisation, has a viscosity of at least 3.5 mPas, preferably in the range of 4.0-9.0 mPas, preferably 4.5-8.0 mPas, measured when dissolved to water at 0.5 weight-% solids concentration, with 5 weight-% addition of NaCl, at room temperature, pH 6.06, using Brookfield DV1 viscometer as described above. If the viscosity is too low, i.e. the average molecular weight is low, the polymer composition is hard or impossible to manufacture by gel polymerisation due to e.g. stickiness of the obtained polymer composition.

The polymer composition is obtained by polymerisation of selected monomers in an aqueous polymerisation medium, which comprises degraded starch. In principle, any degraded starch is suitable for use in the present invention, and the used starch may be degraded in any suitable method or their combinations, which are known in the art. For example, degraded starch may obtained by subjecting the starch to chemical, thermal, or enzymatic degradation, the chemical degradation being preferred. Chemical degradation encompasses both acidic and oxidative degradation, the oxidative degradation being preferred. Hypochlorite, peroxodisulphate, hydrogen peroxide or their mixtures may be used as oxidising agents.

The starch may be cationic, non-ionic or anionic starch. For example, the starch may be oxidized anionic starch or chemically degraded cationic or non-ionic starch. According to one preferable embodiment of the invention degraded starch is degraded cationic starch, degraded native starch or degraded non-ionic starch, such as dextrin. Degraded non-ionic starch, such as dextrin, provides the advantage of high water-solubility of the polymer composition. Use of cationic starch improves the strength effect obtainable with the polymer composition, especially when the polymer composition is obtained by solution polymerisation. The degraded cationic starch provides cationic charges to the polymer composition, and increases the interaction with the anionic groups.

Typically the starch, which may be used in the polymerisation medium, may be any starch, suitable for use in paper making, such as potato, waxy potato, rice, corn, waxy corn, wheat, barley or tapioca starch. Preferably the degraded starch is degraded waxy corn, tapioca, potato or waxy potato starch, degraded tapioca, potato and waxy potato starch being preferred. Amylopectin rich starch is generally preferable. The amylopectin content of the starch may be in the range of 65-100%, preferably 75-100%, more preferably 80-85%. High amylopectin content increases the strength effect obtained in the final surface sized paper or board product.

According to especially preferred embodiment the degraded starch is degraded cationic starch, more preferably oxidized cationic starch. When the polymerisation medium comprises degraded cationic starch the obtained polymer composition may be considered as an amphoteric polymer composition, as it has both anionic and cationic charges, the former originating from the acidic monomers and the latter from the cationic starch.

According to one preferable embodiment of the present invention the polymerisation medium comprises degraded cationic starch, which has a degree of substitution DS in the range of 0.015-0.2, preferably 0.02-0.1, more preferably 0.03-0.08. Degree of substitution defines how many substituted groups are contained in cationic starch, calculated per one anhydroglucose unit of starch. By carefully monitoring the degree of substitution of the used cationic starch it is possible to keep the viscosity of the obtained polymer composition on an acceptable level.

The cationic degraded starch may have a charge density of about 0.05-0.3 meq/g pure cationic starch. The charge density for cationic starch is determined by using following equation:

$$\text{Charge density} = (N\text{-}\% * 10)/14$$

where N-% is the nitrogen value in %, determined by using Kjeldahl-method and 14 is the molecular weight of nitrogen.

According to one embodiment of the invention the polymer composition may have a cationic charge density of 0.02-0.3 meq/g, preferably 0.03-0.15 meq/g, more preferably 0.04-0.1 meq/g, at pH 2.7, calculated as dry. Charge densities are determined by using Mütek PDC-03 tester, titrator PCD-T3, and using 0.001 M PES-Na as a titrant polymer. The polymer composition may contain cationically charged groups less than 20%, preferably less than 15%, more preferably less than 10%, even less than 5%, and more than 1%, calculated from the number total charged groups in the polymer composition. The cationic charge density is carefully adjusted to obtain a good interaction with the anionic groups and simultaneously avoid undesired gelling of the composition. If the polymer composition comprises too many cationically charged groups, it may easily lead to undesired gelling and reduced performance of the polymer composition. Carefully selected cationic charge density is especially advantageous when the polymer composition is obtained by solution polymerisation.

The degraded starch solution has a viscosity in the range of 3-100 mPas, preferably 3-70 mPas, more preferably 4-50 mPas, measured at 10 weight-% solids concentration, at 60° C., Brookfield DV1 viscometer, equipped with Small Sample Adapter (SSA) with spindle SC4-18. Maximum possible rotation speed of the spindle is used. Before viscosity measurement the starch solution is cooked at least for 60 min at 97-99° C.

The aqueous polymerisation medium in the present invention comprises water and degraded starch, as described above. The degraded starch is dissolved into water by cooking, as conventional in the art, before the addition of the monomers and beginning of the polymerisation. According to one preferable embodiment, the polymerisation medium comprises, before the addition of the monomers, 1-30 weight-%, preferably 2-20 weight-%, more preferably 3-15 weight-%, of degraded starch, calculated as dry. The starch content provides an efficient process, as well as minimises the risk undesired gelling of the polymer composition during the polymerisation.

Monomers, which are polymerised in the aqueous polymerisation medium, comprise acrylamide and/or methacrylamide, and at least 2 mol-% of at least one unsaturated mono- or dicarboxylic acid or a salt thereof. According to one embodiment of the invention the amount of at least one mono- or dicarboxylic acid or a salt thereof may be 3-30 mol-%, preferably 6-19 mol-%, more preferably 8-16 mol-%, calculated from total monomer content. The reaction mixture, i.e. monomers in the polymerisation medium, is free of esters of mono- or dicarboxylic acids.

The mono- and dicarboxylic acids suitable for use in the present invention are preferably free from aromatic groups and other cyclic structures. According to one embodiment of the invention the at least one monomer comprising unsaturated mono- or dicarboxylic acid or a salt thereof is selected from the group consisting of acrylic acid, maleic acid, fumaric acid, itaconic acid, aconitic acid, mesaconic acid, citraconic acid, crotonic acid, isocrotonic acid, angelic acid, tiglic acid and any salts thereof. Preferably the polymer composition is obtained by polymerising methylacrylamide and/or acrylamide and unsaturated mono- or dicarboxylic acid selected from group consisting of acrylic acid, maleic acid, itaconic acid and any of their salts.

The reaction mixture, i.e. mixture of monomers and the polymerisation medium, is preferably free of any hydrophobic monomers. The reaction mixture is also preferably free of any vinylaromatic monomers, such as styrene and its derivatives.

The reaction mixture, i.e. mixture of monomers and the polymerisation medium, is preferably free of cationic synthetic monomers.

The polymerisation of the monomers in the aqueous polymerisation medium is performed in the presence of one or more initiators. Any initial capable of initiating free radical polymerisation under the used polymerisation conditions may be used. Examples of suitable initiators are persulfate initiators, such as potassium persulfate and ammonium persulfate, and thermal initiators, such as V-50 (2,2'-azobis(2-methylpropanimidamide) dihydrochloride). The initiators may be added in to the polymerisation medium in the beginning of the polymerisation reaction. The total amount of used initiator(s) is preferably at most 0.9 weight-%, preferably at most 0.85 weight-%, more preferably at most 0.8 weight-%, based on the amount of the monomers. It is advantageous to use as low amounts of initiator as possible in order to minimise the occurrence of polymerisation reactions between the monomers and degraded starch.

According of one embodiment of the invention the polymer composition is obtained by solution polymerisation. The selected monomers are added to the aqueous polymerisation medium, which comprises degraded starch, and the formed reaction mixture is polymerised in presence of initiator(s) by using free radical polymerisation. The used monomers are dissolved in the aqueous polymerisation medium and the polymerisation reaction results in a polymer which also soluble in the aqueous polymerisation medium. No phase formation (polymer/medium) or phase separation (polymer/medium) occurs. The temperature during the polymerisation may be 60-100° C., preferably 70-90° C. The pH of the polymer composition during the polymerisation is usually acidic, for example pH is from 2.5 to 7.

The polymer composition obtained by solution polymerisation may have a dry solids content of 10-30 weight-%, preferably 15-25 weight-%. In the polymer composition obtained by solution polymerisation the amount of degraded starch may be in the range of 1-50 weight-%, preferably 4-35 weight-%, more preferably 10-25 weight-%, calculated as dry, and calculated from the total dry solids of the composition, which thus includes both starch and monomers. The polymer composition obtained by solution polymerisation may comprise 50-95 weight-%, preferably 60-90 weight-%, more preferably 70-85 weight-%, of polymerised monomers, calculated as dry and calculated from total dry solids of the composition, including thus both starch and monomers.

According to another embodiment of the invention the polymer composition is in dry, particulate form. Dry polymer composition is easy to store and transport, and provides an excellent storage stability and long self-life. The polymer composition in dry particulate form may be obtained by gel polymerisation of a reaction mixture comprising necessary monomers in polymerisation medium comprising degraded starch. The monomers in the reaction mixture are polymerised in presence of initiator(s) by using free radical polymerisation. The monomer content in the reaction mixture at the beginning of the polymerisation may be at least 20 weight-%. Content of non-aqueous solvent in the reaction mixture is less than 10 weight-%. The temperature in the beginning of the polymerisation may be less than 40° C. or less than 30° C. Sometimes the temperature in the beginning of the polymerisation may be even less than 5° C. The temperature during polymerisation may be 60-90° C. The pH of the reaction mixture is usually acidic, for example the pH is from 2.5 to 7. The free radical polymerisation of the monomers in the polymerisation medium comprising starch produces three-dimensional polymer, which is in gel form or highly viscous liquid. The total polymer content, i.e. polymerised monomers and starch, in the obtained polymer composition is at least 60 weight-%, for example at least 70 weight-%.

After the gel polymerisation, the obtained polymer composition in gel form is mechanically comminuted, such as shredded or chopped, as well as dried, whereby a particulate polymer composition is obtained. Depending on the used reaction apparatus, shredding or chopping may be performed in the same reaction apparatus where the polymerisation takes place. For example, polymerisation may be performed in a first zone of a screw mixer, and the shredding of the obtained polymer composition is performed in a second zone of the said screw mixer. It is also possible that the shredding, chopping or other particle size adjustment is performed in a treatment apparatus, which is separate from the reaction apparatus. For example, the obtained water-soluble polymer composition in gel form may be transferred from the second end of a reaction apparatus, which is a belt conveyor, through a rotating hole screen or the like, where it is shredded or chopped into small particles.

After shredding or chopping the comminuted polymer composition is dried, milled to a desired particle size and packed for storage and/or transport. According to one embodiment the polymer composition may be dried to a solids content of at least 85 weight-%, preferably at least 90 weight-%, more preferably at least 95 weight-%.

According to one embodiment of the invention the polymer composition in dry particulate form comprises particles or granules, which have an average particle size of <2.5 mm, preferably <2.0 mm, more preferably <1.5 mm. These particles are obtained by subjecting the obtained polymer composition in gel form to mechanical comminution, such as cutting, milling, shredding, chopping or the like, as described above. When the polymer composition is comminuted into small particles, it is easy to dissolve when used at the paper or board mill.

In addition of above described monomers, the reaction mixture may also comprise branching agent(s) and/or cross-linker(s), such as methylenebisacrylamide, MBA. However, branching agents and/or crosslinkers are not necessary for obtaining the desired polymer composition as the interpenetrating network formed of monomers and starch provides the required three dimensional nature for the polymer composition.

The reaction mixture may also comprise any suitable chain transfer agent, such as alcohols, mercaptans, thioacids, phosphites, sulphites, organic acids, or any salts thereof. The amount of chain transfer agent(s) is selected in order to obtain the desired viscosity.

According to one embodiment of the invention the surface size composition comprises 0.5-10 weight-%, preferably 0.5-5 weight-%, more preferably 0.7-3 weight-%, of polymer composition according to the present invention. Other main components of the surface size composition are water and surface size starch. Surface size composition, i.e. surface size, is obtained by mixing the polymer composition with cooked surface size starch. Cooking of surface size starch is done by using conventional methods, which are known as such for a person skilled in the art. The polymer composition tolerates high temperatures and it may be added to the solution of surface size at temperature of 50-90° C., preferably 60-90° C., more preferably 70-90° C. The surface size starch may be any conventionally used degraded starch for surface sizing, such as enzymatically, chemically, thermally degraded starch, such as corn or wheat starch.

The surface size composition typically has a solids content of 0.5-25 weight-%, preferably 3-20 weight-%, more preferably 5-12 weight-%, calculated as dry solids.

According to one preferable embodiment of the invention the water-soluble polymer composition of the invention is used for surface sizing of board or paper, especially for surface sizing of packaging grade board. Surface size composition comprising the polymer composition may be used for surface sizing of liner, fluting, folding boxboard (FBB), white lined chipboard (WLC), solid bleached sulphate (SBS) board or solid unbleached sulphate (SUS) board. It has been observed that the polymer composition improves the SCT strength and burst strength of the packaging grade board when it is applied on the board surface. The improved strength of packaging grade board enables a reduction in basis weight of the board, while maintaining the strength of the final package. In this manner it is possible to make the packages lighter, which is both economical and ecological, when goods are transported around the globe. The board to be sized may have a grammage from 60 to 500 g/m$^2$, preferably in the range of 70-250 g/m$^2$, more preferably 100-180 g/m$^2$.

The surface size composition according to the present invention is suitable for paper or board, which may be based 100% on primary fibres, 100% on recycled fibres, or to any possible blend between primary and recycled fibres. For example, the fibres in the stock may comprise at least 80% recycled fibres, preferably at least 90% recycled fibres, sometimes even 100% recycled fibres. Recycled fibres may originate from old corrugated cardboard and/or mixed paper grades. Preferably a mixture of old corrugated cardboard and mixed paper grades is used for recycled fibres.

The surface size composition according to the present invention is suitable for paper or board, which is prepared from stock, which comprises inorganic filler(s). According to one embodiment the ash content may be 3-20% for folding box board or 10-20%, preferably 15-20% for liner or fluting. Standard ISO 1762, temperature 525° C. is used for ash content measurements.

It has been observed that the surface size composition that comprises the polymer composition according to the present invention does not show high viscosity increase when the amount of polymer composition is increased in the surface size composition. In practice this means that the surface size composition may contain higher amount of polymer composition. In this manner a lower amount of size composition is needed and the web is not re-wetted by size solution as extensively, which increases the wet strength of the fibre web and reduces the risk of web break. When the risk for web breaks is minimised, the production speed of the paper/board machine can be increased. Also less dryer capacity after surface sizing is needed, the dryer capacity nowadays forming the bottleneck of the production line. Alternatively, higher amounts of polymer composition can be applied on the surface of the fibre web by using conventional application amount for increased strength properties in the produced paper or board.

Viscosity of the surface size composition has an impact to the penetration of the size composition into the paper sheet. Conventional linear high molecular weight strength polymers increase the viscosity of the surface size composition, whereby the penetration of the size, especially the surface size starch, into the web is retarded. It is believed that low viscosity of the surface size composition, obtainable with the present invention, may produce an additional effect, namely that the penetration of the size into the fibre web is not retarded and the size penetrates deeper into the fibre web. Good penetration is advantageous for obtaining an improved SCT-strength and Z-directional tensile strength or Scott bond strength. Thus by using the present surface size composition, which comprises the polymer composition having three-dimensional interpenetrating polymer network, it is possible to achieve both increased strength and a size viscosity that is sufficiently low to allow satisfactory penetration of the surface size composition.

According to one embodiment of the invention the surface size composition, which comprises 2-5 weight-% of the polymer composition (calculated as dry solids), has a viscosity of 3-50 mPas, preferably 4-35 mPas, more preferably 5-25 mPas, even more preferably 6-20 mPas, sometimes even more preferably 7-15 mPas, measured at 60° C. by using Brookfield DV1 viscometer, equipped with Small Sample Adapter (SSA) with spindle SC4-18. Maximum possible rotation speed of the spindle is used.

According to one embodiment of the invention the surface size composition, which comprises the polymer composition, is applied on the surface of a fibre web in amount of at least 0.5 g/m$^2$/side, preferably at least 1.5 g/m$^2$/side, more preferably 1.5-2.5 g/m$^2$/side, more preferably 1.7-2.3 g/m$^2$/side. These application amounts are especially preferred for surface sizing of liner and fluting.

The polymer composition may be applied on the surface of the paper, board or the like in amount of 0.03-0.5 g/m$^2$, preferably 0.04-0.3 g/m$^2$, more preferably 0.06-0.2 g/m$^2$, calculated as active polymer.

The surface size composition may also comprise additional components, such as brighteners, biocides, polyaluminium chloride, alum and/or crosslinkers, such as glyoxal. The surface size composition may also comprise hydrophobication agents, such as acrylates, alkyl succinic anhydride (ASA), alkyl ketene dimer (AKD).

The surface size composition is preferably free of inorganic mineral fillers and/or inorganic mineral pigments.

According to another embodiment the polymer composition according to the present invention may also be used for surface sizing of gypsum board. In this case the surface size composition typically comprise only water and polymer, i.e. the polymer composition is ready for use for surface sizing of gypsum board after it has been diluted to a suitable concentration by water.

EXPERIMENTAL

Some embodiments of the invention are described in the following non-limiting examples.

The following methods are used to characterise the polymer compositions obtained in the following examples.

Dry content of a polymer composition is determined by placing a sample in an oven at 110° C., for 5 h.

pH values are determined by pH meter, Knick Portamess, Van London-Phoenix company, Texas, USA Viscosity of a polymer composition in solution form is determined by using Brookfield DV1 viscometer, equipped with small sample adapter, at 25° C. Spindle SC4-18 is used for solution which has viscosity of 1000 mPas or less, and spindle SC4-31 is used for solution which has viscosity over 1000 mPas. Maximum rotation speed is used in the determination to get maximum torque value in each determination.

Viscosity of cooked starch solution is determined at 10% concentration at 60° C. Starch is cooked at 10% concentration at 97-99° C. temperature for 60 min. Evaporated water is added to the starch solution to get the exact concentration, and the viscosity is then determined by using Brookfield DV1 viscometer, equipped with small sample adapter, at 60° C. Spindle SC4-18 and maximum rotation speed is used. Characteristics of starch products which are used in the following production examples are given in the Table 1.

TABLE 1

Characteristics of starch products which are used for the production of polymer compositions.

| Starch product | Degree of cationic substitution | Charge density at pH 2.7 [meq/g dry] | Viscosity of cooked starch at 10% at 60° C. [mPas] | pH of cooked starch at 10% at 25° C. |
|---|---|---|---|---|
| Starch 1 | 0.050 | 0.30 | 40.6 | 7.6 |
| Starch 2 | 0.043 | 0.26 | 4.5 | 5.1 |
| Starch 3 | 0.00 | 0.00 | 6.5 | 4.95 |

Charge densities in the following examples are determined by using Mütek PDC 03 pH—particle charge detector (BTG Instruments GmbH, Herrsching, Germany) equipped with Mütek PCD Titrator Three-titrator unit (BTG Instruments GmbH, Herrsching, Germany), and by using a) 0.001 M PES-Na as titrant polymer for net cationic polymers, and b) 0.001 N poly-DADMAC as titrant polymer for net anionic polymers. Both titrant polymers are supplied by BTG Instruments GmbH, Herrsching, Germany.

Production of Polymer Compositions Obtained by Solution Polymerisation

Example 1: Production of Polymer Composition Which Comprises 20 Weight-% of Cationic Oxidized Starch, "Product 1"

Starch used in the polymerisation is "Starch 1", which is a cationic oxidized waxy potato starch. The charcteristics of "Starch 1" are given in Table 1.

Monomer mixture is obtained by mixing 62 g of de-ionized water, 275 g of acrylamide (50%), 20 g of acrylic acid, 1.1 g of formic acid (50%), 0.7 g of EDTA aqueous solution (39%) in a monomer tank. The monomer mixture is purged with nitrogen gas for 15 min.

0.83 g of ammonium persulfate is dissolved in 34 g of de-ionized water in a catalyst tank.

540 g of de-ionized water is dosed into a polymerisation reactor, equipped with mechanical agitator, a condenser and a jacket for heating and cooling. 49 g of "Starch 1" (82%) is sludged into water under agitation. 1.0 g of citric acid is dosed into the polymerisation reactor, pH of the mixture is 2.8. The resulting mixture is heated to 100° C. and mixed for 30 min. Temperature is then decreased to 80° C.

Feed of the monomer mixture from the monomer tank and feed of the ammonium persulfate solution from the catalyst tank are started at the same time. Constant feed of monomer mixture is performed under 60 min and constant feed of ammonium persulfate solution is performed under 90 min. During feeding the temperature is kept at 80° C. with the aid of the heating and cooling jacket. When the feed of the ammonium persulfate solution is ended, the reaction mixture is agitated for 30 min at 80° C.

558 g of de-ionized water is added and the mixture is cooled to 25° C. pH of the obtained polymer composition solution is 3.0 and the pH is adjusted to 3.7 with sodium hydroxide (20 weight-%). Dry content of the polymer composition solution is 13.0%, and the viscosity is 10 900 mPas, measured as defined above.

Example 2: Production of Polymer Composition Which Comprises 20 Weight-% of Cationic Oxidized Starch, "Product 2"

"Starch 1", as in Example 1, is employed in the polymerisation.

1.24 g of ammonium persulfate is dissolved in 34 g of de-ionized water in a catalyst tank.

Monomer mixture is obtained by mixing 50 g of de-ionized water, 220 g of acrylamide (50%), 15.9 g of acrylic acid, 0.9 g of formic acid (50%), 0.7 g of EDTA aqueous solution (39%), and 0.068 g of thioglycolic acid in a monomer tank. The monomer mixture is purged with nitrogen gas for 15 min.

525 g of de-ionized water is dosed into a polymerisation reactor, equipped with mechanical agitator, a condenser and a jacket for heating and cooling. 41 g of "Starch 1" (82%) is sludged into water under agitation. 0.8 g of citric acid is dosed into the polymerisation reactor. The resulting mixture is heated to 100° C. and mixed for 30 min. Temperature is then decreased to 80° C.

Feed of the monomer mixture from the monomer tank and feed of the ammonium persulfate solution from the catalyst tank are started at the same time. Constant feed of the monomer mixture is performed under 60 min and constant feed of the ammonium persulfate solution is performed under 90 min. During feeding the temperature is kept at 80° C. with the aid of the heating and cooling jacket. When the feed of the ammonium persulfate solution is ended, the reaction mixture is agitated for 30 min at 80° C.

109 g of de-ionized water is added and the mixture is cooled to 25° C. pH of the obtained polymer composition solution is 2.9 and the pH is adjusted to 3.7 with sodium hydroxide (20 weight-%). Dry content of the polymer composition is 16.6%, and the viscosity is 1 950 mPas, measured as defined above.

Example 3: Production of Polymer Composition Which Comprises 30 Weight-% of Cationic Oxidized Starch, "Product 3"

"Starch 1", as in Examples 1 and 2, is employed in the polymerisation.

1.24 g of ammonium persulfate 1.24 g is dissolved in 34 g of de-ionized water in a catalyst tank.

Monomer mixture is obtained by mixing 43 g of de-ionized water, 192 g of acrylamide (50%), 13.9 g of acrylic acid, 0.8 g of formic acid (50%), 0.7 g of EDTA aqueous solution (39%), and 0.068 g of thioglycolic acid in a monomer tank. The monomer mixture is purged with nitrogen gas for 15 min.

525 g of de-ionized water is dosed into a polymerisation reactor, equipped with mechanical agitator, a condenser and a jacket for heating and cooling. 60 g of "Starch 1" (82%) is sludged into water under agitation. 0.8 g of citric acid is dosed into the polymerisation reactor. The resulting mixture is heated to 100° C. and mixed for 30 min. Temperature is then decreased to 80° C.

Feed of the monomer mixture from the monomer tank and feed of the ammonium persulfate solution from the catalyst tank are started at the same time. Constant feed of the monomer mixture is performed under 60 min and constant feed of the ammonium persulfate solution is performed under 90 min. During feeding the temperature is kept at 80° C. with the aid of the heating and cooling jacket. When the feed of ammonium persulfate solution is ended, the reaction mixture is agitated for 30 min at 80° C.

128 g of de-ionized water is added and the mixture is cooled to 25° C. pH of the obtained polymer composition solution is 2.7 and the pH is adjusted to 3.7 with sodium hydroxide (20 weight-%). Dry content of the polymer composition is 16.3%, and the viscosity is 1 580 mPas, measured as defined above.

Example 4: Production of Polymer Composition Which Comprises 20 Weight-% of Cationic Oxidized Potato Starch, "Product 4"

Starch used in the polymerisation is "Starch 2", which is cationic oxidized potato starch. The characteristics of "Starch 2" are given in Table 1.

Monomer mixture is obtained by mixing 343 g of acrylamide (37.5%), 18.6 g of acrylic acid, 0.0005 g of methylenebisacrylamide, 0.33 g of sulfuric acid (93%), 0.72 g of DTPA aqueous solution (40%), and 0.068 g of thioglycolic acid in a monomer tank. The monomer mixture is purged with nitrogen gas for 15 min.

1.24 g of ammonium persulfate is dissolved in 34 g of de-ionized water in a catalyst tank.

498 g of de-ionized water is dosed into a polymerisation reactor, equipped with mechanical agitator, a condenser and a jacket for heating and cooling. 46 g of "Starch 2" (82%) is sludged into water under agitation. 0.8 g of citric acid is dosed into the polymerisation reactor. The resulting mixture is heated to 100° C. and mixed for 30 min. Temperature is then decreased to 80° C.

Feed of the monomer mixture from the monomer tank and feed of the ammonium persulfate solution from the catalyst tank are started at the same time. Constant feed of the monomer mixture is performed under 60 min and constant feed of the ammonium persulfate solution is performed under 90 min. During feeding the temperature is kept at 80° C. with the aid of the heating and cooling jacket. When the feed of the ammonium persulfate solution is ended, the reaction mixture is agitated for 30 min at 80° C.

55 g of de-ionized water is added and the mixture is cooled to 25° C. pH of the obtained polymer composition solution is 2.8 and the pH is adjusted to 3.7 with sodium hydroxide (20 weight-%). Dry content of the polymer composition is 19.0%, and the viscosity is 2670 mPas, measured as above described.

Example 5: Production of Polymer Composition Which Comprises 30 Weight-% Cationic Oxidized Potato Starch, "Product 5"

"Starch 2", as in Example 4, is employed in the polymerisation.

1.24 g of ammonium persulfate is dissolved in 34 g of de-ionized water in a catalyst tank.

Monomer mixture is obtained by mixing 49 g of de-ionized water, 216 g of acrylamide (50%), 15.6 g of acrylic acid, 0.9 g of formic acid (50%), 0.7 g of EDTA aqueous solution (39%) in a monomer tank. The monomer mixture is purged with nitrogen gas for 15 min.

525 g of de-ionized water is dosed into a polymerisation reactor, equipped with mechanical agitator, a condenser and a jacket for heating and cooling. 64 g of "Starch 2" (82%) is sludged into water under agitation. 0.8 g of citric acid is dosed into the polymerisation reactor. The resulting mixture is heated to 100° C. and mixed for 30 min. Temperature is then decreased to 80° C.

Feed of the monomer mixture from the monomer tank and feed of the ammonium persulfate solution from the catalyst tank are started at the same time. Constant feed of the monomer mixture is performed under 60 min and constant feed of the ammonium persulfate solution is performed under 90 min. During feeding the temperature is kept at 80° C. with the aid of the heating and cooling jacket. When the feed of the ammonium persulfate solution is ended, the reaction mixture is agitated for 30 min at 80° C.

91 g of de-ionized water is added and the mixture is cooled to 25° C. pH of the obtained polymer composition solution is 2.8 and the pH is adjusted to 3.7 with sodium hydroxide (20 weight-%). Dry content of the polymer composition is 18.6%, and the viscosity is 3730 mPas, measured as described above.

Properties of Polymer Compositions of Examples 1-5

A summary of the properties of the obtained polymer compositions of Examples 1 to 5 is presented in Table 2.

TABLE 2

Properties of the polymer compositions of Examples 1-5, obtained by solution polymerisation.

| Property | Product 1 | Product 2 | Product 3 | Product 4 | Product 5 |
|---|---|---|---|---|---|
| Dry starch of dry solids of the composition, % | 20 | 20 | 30 | 20 | 30 |
| Dry solids of the composition, % | 13.0 | 16.6 | 16.3 | 19.0 | 18.6 |
| pH | 3.7 | 3.7 | 3.7 | 3.7 | 3.7 |
| Viscosity at 25° C., mPas | 10 900 | 1 950 | 1 580 | 2 670 | 3 730 |
| Viscosity at 10% dry solids at 25° C., mPas | 1 300 | 171 | 159 | 116 | 175 |
| Charge density at pH 2.7, meq/g dry solids | 0.056 | 0.057 | 0.084 | 0.050 | 0.078 |
| Charge density at pH 7.0, meq/g dry solids | −1.31 | −1.29 | −1.09 | −1.34 | −1.16 |

Production of Polymer Compositions Obtained by Gel Polymerisation

Example 6: General Procedure for Production of Polymer Compositions

Starch is dissolved in water by heating it to almost boiling point for 30 minutes, followed by cooling down at room temperature.

A polymerisation reactor is charged with the cooked starch dissolved in water. The polymerisation of acrylamide and acrylic acid is done in the aqueous starch solution by adding aqueous acrylamide solution (50%) and acrylic acid in a molar ratio given for each composition in Table 3.

The initial pH of the aqueous starch solution comprising the monomers is about 2-4. For the polymerisation reaction the pH of the monomer mixture is adjusted to neutral pH, about pH 6, by adding NaOH (50 weight-%). Other chemicals, such as chain transfer agents, chelating agents, and thermal initiators are added to the aqueous starch solution comprising the monomers. Then, the solution is degassed at low temperature by a continuous supply of nitrogen gas. Polymerisation is initiated by injecting a redox pair initiator system into the polymerisation reactor.

An anionic polyacrylamide gel is obtained as a result of the polymerisation reaction. The gel is dried and finally powder or particles are obtained. The polymer compositions have dryness of 90-95 weight-%. Polymer properties are measured by using the obtained powder.

Dried polymers have molecular weight of about 1 MDa. No difference in molecular weight is observed between polymer compositions prepared using cationic starch or non-ionic starch (dextrin).

The amounts of starch, either cationic or non-ionic, in the polymer composition are also given in Table 3. The amounts are given based on 100 weight-% total monomers. Characteristics of the starches are given in the Table 1.

Viscosities of the obtained polymer compositions are measured as follows:

Polymer composition is dissolved in water at 0.5 weight-% concentration. NaCl was added in order to obtain 5 weight-% concentration. pH of the polymer composition is adjusted to pH 6.06. Brookfield DV1 viscometer is used for viscosity measurements as describe above.

Measured viscosity values are for the polymer compositions are given in Table 3.

Charge density values for polymer compositions are measured as described above by using Mütek PDC 03, pH 7.0, 0.001 N poly-DADMAC as titrant polymer.

Insoluble particles are determined as follows:

0.5 weight-% of dry polymer composition is mixed with 1500 ml of deionized water mixed with a magnetic stirrer for 60 min. NaCl is added to the sample solution, to obtain salt concentration of 5 weight-%, and mixed for further 5 minutes. Insoluble particles are measured using a stainless steel sieve with aperture 500 microns. The sieve is filled with 1500 ml of the aqueous sample and allowed to drain. The sieve is washed with 1000 ml of cold water. Total drainage time does not exceed 5 minutes. Gels and/or particles remaining on the sieve are visually counted. The results are given in Table 3.

TABLE 3

Properties of polymer composition obtained by gel polymerisation.

| | Used Starch | Molar ratio Acrylamide:Acrylic acid | Amount of starch [weight-%] | Viscosity [cP] | Number of insoluble particles | Charge density, at pH 7 [meq/g] |
|---|---|---|---|---|---|---|
| Reference 1 | — | 92:8 | 0 | 5.1 | 0 | −1.2921 |
| Reference 2 | — | 7:1 | 0 | 5.1 | 2 | −1.84 |
| Product 5 | Starch 2 | 7:1 | 26.46 | 8 | NA | −1.42 |

TABLE 3-continued

Properties of polymer composition obtained by gel polymerisation.

|  | Used Starch | Molar ratio Acrylamide:Acrylic acid | Amount of starch [weight-%] | Viscosity [cP] | Number of insoluble particles | Charge density, at pH 7 [meq/g] |
|---|---|---|---|---|---|---|
| Product 6 | Starch 3 | 7:1 | 29.37 | 4.55 | 4 | −1.4 |
| Product 7 | Starch 2 | 7:1 | 11.06 | 5.5 | 0 | −1.58 |
| Product 8 | Starch 2 | 7:1 | 6.36 | 5.5 | 4 | −1.68 |

It can be seen from Table 3 that the solubility of the obtained polymer composition in the water is good as the number of insoluble particles is generally low. The results of Table 3 indicate that relatively large amounts of non-ionic "Starch 3" can be incorporated into the polymer composition without negatively affecting the water-solubility of the polymer composition.

Surface Sizing Experiments

Size press parameters were as follows:
Size press manufacturer: Werner Mathis AG, CH 8155 Niederhasli/Zürich; Size press model: HF 47693 Type 350; Operation speed: 2 m/min; Operation pressure: 1 bar; Operation temperature: 60° C.; Sizing solution volume: 140 ml/test; Sizing times/sheet: 2.

Sizing is performed in machine direction and the surface size composition is applied as 9-12 weight-% solution. Commercial starch products, which are thermally modified dextrins, tradenames C*film 07311 (Cerestar Cargill) or C*film 07312 (Cerestar Cargill), are used as surface size starch. The starch is selected to simulate enzymatically degraded native starch.

Sizing composition is prepared as follows: A 15 weight-% solution of surface size starch, as defined above, is cooked for 30 min at 95° C. Surface size compositions are prepared by mixing of water, cooked starch solution and polymer composition, in this order. Thus polymer composition, calculated as dry, is added to the cooked surface size starch solution, and mixed at 70° C., for at least 2 min. Viscosity of the obtained composition is measured by using Brookfield DV1, at 60° C., at 9% concentration, otherwise as described above. The surface size compositions are stored at 70° C. until surface sizing experiments are carried out.

Base paper was Schrenz paper, 100 g/m², 100% recycled fibre based liner grade without size press. The base paper had an ash content of 16.4% (measured with standard ISO 1762, temperature 525° C.) and bulk value 1.57 cm³/g (measured with standard ISO 534).

The test samples are sized twice, and the properties of the sized sheets are measured. The used measurements, testing devices and standards are given in Table 4.

TABLE 4

Sheet testing devices and standards used.

| Measurement | Device | Standard |
|---|---|---|
| Basis weight | Mettler Toledo | ISO 536 |
| SCT GM Index (Short Span Compression test) | Lorentzen & Wettre Compression Strength tester | ISO 9895 |
| Burst strength | IDM Test EM-50/80 | ISO 2758 |
| CMT30 Index | Sumet-Messtechnik SC-500 Fluter: PTA Group AV-S | ISO 7263: 1994 |

TABLE 4-continued

Sheet testing devices and standards used.

| Measurement | Device | Standard |
|---|---|---|
| Wet web tensile | Lorentzen & Wettre Tensile strength tester | SCAN-CM 69:09 |

Drying of the sized sheets is made in one-cylinder felted steam heated dryer drum at 95° C. for 1 min. Shrinkage is restricted in dryer.

Solution polymers, which are used in comparative experiments, are copolymers of acrylamide and acrylic acid. The properties of comparative polymers are given in Table 5. Dry solids content is determined by placing composition sample in an oven at 110° C., for 5 h. Viscosities are determined with Brookfield DV1 viscometer, equipped with small sample adapter, spindle SC4-31, at 25° C. Charge densities are determined by Mütek PDC 03 at pH 7.0 using 0.001 N poly-DADMAC as titrant polymer.

TABLE 5

Properties of solution polymers used for comparative experiments.

| Polymer | Dry solids content [%] | Viscosity [mPas] | Charge density, at pH 7.0 [meq/g dry] | pH |
|---|---|---|---|---|
| APAM 1 | 14.8 | 6 950 | −1.1 | 5.1 |
| APAM 2 | 20.4 | 9 100 | −1.1 | 5.1 |
| APAM 3 | 13.7 | 8 100 | −1.8 | 5.2 |

The results for the surface sizing experiments are given in Tables 6-8. The measured results for a surface size composition comprising starch C*film 07311 and a polymer component (as indicated in the column "Polymer") after one or two passes are given in Table 6 (as indicated in the column "Passes"). The measured results for a surface size comprising starch C*film 07311 and a polymer component (as indicated in the column "Polymer") after one pass are given in Table 7. The measured results for a surface size composition comprising starch C*film 07312 and a polymer component (as indicated in the column "Polymer") after two passes in Table 8. The percentage values for pick-up in Tables 6, 7 and 8 are calculated from weight increase of an air-conditioned sheet, where the basis weight of the sheet is measured before and after sizing. The indexed values in Tables 6, 7 and 8 are given as the strength divided by the basis weight of the paper/board. The geometric (GM) value is the square root of (MD value)*(CD value). MD value is the measured strength value in machine direction and CD value is the measured strength value in machine cross direction.

TABLE 6

The measured results for a surface size composition comprising starch C*film 07311 and a polymer component.

| Experiment | Remark | Polymer | Polymer dosage, % of size dry | Passes | Sizing concentration, % | Viscosity, mPas | Dosage, kg/t | Pick-up, % | Burst index, kPam2/g | SCT GM index, Nm/g | Wet tensile index, Nm/g |
|---|---|---|---|---|---|---|---|---|---|---|---|
| 1-1 | ref. |  | 0 | 1 | 9 | 1.7 |  | 4.09 | 1.97 | 23.71 |  |
| 1-2 | ref. |  | 0 | 2 | 9 | 1.7 |  | 6.36 | 1.85 | 24.32 | 0.38 |
| 1-3 | comp. | APAM 1 | 2.5 | 2 | 9 | 6 | 1.44 | 5.75 | 1.86 | 24.86 | 0.40 |
| 1-4 | comp. | APAM 1 | 5 | 2 | 9 | 9.6 | 2.79 | 5.59 | 1.99 | 25.44 | 0.42 |
| 1-5 |  | Product 2 | 2.5 | 2 | 9 | 2.9 | 1.31 | 5.24 | 2.02 | 25.04 | 0.51 |
| 1-6 |  | Product 2 | 5 | 2 | 9 | 2.9 | 2.49 | 4.98 | 2.06 | 25.33 | 0.48 |

From Table 6 it is seen that Experiments 1-5 and 1-6 show better burst index and wet tensile index values than the reference experiments and comparative experiments. The SCT GM index obtained by using surface size composition comprising polymer composition according to the invention is similar to the values obtained in the comparative experiments but was achieved with lower pick-up level of the surface size composition, and thus with a lower surface size starch consumption.

From Table 7 it is seen that experiments from 2-5 to 2-8 show better burst index values than the reference experiment and comparative experiments. Experiments 2-5 and 2-6 show better SCT GM index values than the reference experiment and the comparative experiments, even with lower pick-up level of the surface size composition. The surface starch consumption is thus lower. Experiment 2-7 achieved better SCT GM index value with lower dosage compared to comparative experiment 2-3. Experiments from 2-5 to 2-8 achieved higher dry content after sizing than the reference experiment and comparative experiments, leading into lower energy consumption at drying. The web has also higher strength at higher dry content, whereby the web is less susceptible to web break. Higher dry content and higher web strength may enable an increase in machine speed.

TABLE 7

The measured results for a surface size composition comprising starch C*film 07311 and a polymer component after one pass.

| Experiment | Remark | Polymer | Polymer dosage % of size dry | Dosage, kg/t dry | Pick-up, % | Burst index, kPam$^2$/g | SCT GM index, Nm/g | Dry content after sizing, % |
|---|---|---|---|---|---|---|---|---|
| 2-1 | ref. |  | 0.0 | 0.0 | 7.7 | 1.90 | 22.8 | 53.8 |
| 2-2 | comp. | APAM 2 | 2.5 | 1.8 | 7.1 | 2.09 | 22.9 | 55.8 |
| 2-3 | comp. | APAM 2 | 5.0 | 3.4 | 6.9 | 2.04 | 23.6 | 56.7 |
| 2-4 | comp. | APAM 3 | 2.5 | 1.7 | 6.7 | 2.05 | 23.9 | 57.3 |
| 2-5 |  | Product 2 | 2.5 | 1.6 | 6.3 | 2.12 | 24.1 | 58.7 |
| 2-6 |  | Product 2 | 5.0 | 3.0 | 5.9 | 2.11 | 24.2 | 60.4 |
| 2-7 |  | Product 5 | 2.5 | 1.5 | 5.9 | 2.11 | 23.9 | 60.5 |
| 2-8 |  | Product 5 | 5.0 | 2.7 | 5.4 | 2.15 | 23.8 | 62.7 |

TABLE 8

The measured results for a surface size composition comprising starch C*film 07312 and a polymer component and after two passes.

| Experiment | Remark | Polymer | Polymer dosage, % of size dry | Sizing concentration, % | Pick-up, % | Burst index, kPam$^2$/g | SCT index GM, Nm/g |
|---|---|---|---|---|---|---|---|
| 3-1 | Unsized |  |  |  | 0.0 | 1.50 | 17.2 |
| 3-2 | ref. |  | 0 | 9 | 4.5 | 2.16 | 25.0 |
| 3-3 |  | Product 2 | 2 | 9 | 4.1 | 2.22 | 25.6 |
| 3-4 |  | Product 2 | 4 | 9 | 3.9 | 2.23 | 25.7 |
| 3-5 |  | Product 3 | 2 | 9 | 3.9 | 2.22 | 25.2 |
| 3-6 |  | Product 3 | 4 | 9 | 3.8 | 2.20 | 25.5 |
| 3-7 |  | Product 5 | 2 | 9 | 3.9 | 2.25 | 25.4 |
| 3-8 |  | Product 5 | 4 | 9 | 3.9 | 2.17 | 26.2 |
| 3-9 |  | Product 4 | 2 | 9 | 3.8 | 2.24 | 25.7 |
| 3-10 |  | Product 4 | 4 | 9 | 3.9 | 2.20 | 26.1 |

From Table 8 it is seen that all the tested surface size compositions comprising polymer compositions according to the invention, achieve desired strength results and lower pick-up values and thus lower size consumption compared to the reference. The surface starch consumption is thus lower. Additionally, experiments 3-3, 3-4, and 3-9 achieve both high burst index and high SCT GM index.

Penetration Experiment

Penetration measurement is performed as follows:

The equipment used for penetration dynamic analysis (PDA) is Surface & Sizing Tester EST12.2. A sample of paper is immersed to a dish of starch solution, which is placed to water basin. Temperature in starch dish is 60° C. and the temperature in water basin varied between 25° C. and 35° C. The paper sample is attached to a sample holder with two-sided adhesive. The ultrasonic movement through the sample changes as the wetting advances. Penetration is calculated from as 100%–PDA signal %. The result is given as percentage of penetration at any given time.

Dynamic Penetration Results

The penetration study is started by testing surface size compositions comprising a polymer composition and commercial starch C*film 07312. Used polymer compositions are "Product 2" and APAM3, as defined earlier. Experiments are performed by using three different solids concentration for the surface size composition. For each size concentration both polymer compositions are tested at two dosages, 2 and 4 weight-%. The reference experiment for each size concentration comprises pure surface size starch without addition of a polymer composition. Each experiment is conducted using 4 repeats. The objective is to find out the magnitude by which concentration of size and polymer composition affect the dynamic penetration. The results are given in Table 9.

TABLE 9

Penetration and viscosity test result with C*film 07312 starch.

| Experiment | Remark | Polymer | Polymer Dosage, % of size, dry | Size concentration, % | Penetration at 2,4 s, % of paper | Time at 30% pentration, s | Viscosity, mPas |
|---|---|---|---|---|---|---|---|
| 4-1 | ref. | — | 0 | 6 | 82.4 | 0.24 | 2.0 |
| 4-2 | | Product 2 | 2 | 6 | 81.8 | 0.24 | 3.0 |
| 4-3 | | Product 2 | 4 | 6 | 77.1 | 0.26 | 2.9 |
| 4-4 | comp. | APAM3 | 2 | 6 | 78.9 | 0.27 | 5.9 |
| 4-5 | comp. | APAM3 | 4 | 6 | 77.6 | 0.26 | 9.1 |
| 4-6 | ref. | — | 0 | 9 | 62.5 | 0.39 | 4.3 |
| 4-7 | | Product 2 | 2 | 9 | 66.1 | 0.40 | 7.6 |
| 4-8 | | Product 2 | 4 | 9 | 63.0 | na | 7.6 |
| 4-9 | comp. | APAM3 | 2 | 9 | 58.2 | 0.58 | 11.9 |
| 4-10 | comp. | APAM3 | 4 | 9 | 61.5 | na | 21.7 |
| 4-11 | ref. | — | 0 | 12 | 50.0 | na | 9.3 |
| 4-12 | | Product 2 | 2 | 12 | 57.1 | na | 20.8 |
| 4-13 | | Product 2 | 4 | 12 | 51.0 | na | 22.4 |
| 4-14 | comp. | APAM3 | 2 | 12 | 48.3 | na | 29.7 |
| 4-15 | comp. | APAM3 | 4 | 12 | 49.4 | na | 44.8 |

It is seen from Table 9 that "Product 2" gives more or faster penetration than the comparative polymer composition. Also the lower viscosities, which are obtained when using "Product 2", allow more even size distribution and metering at film size press. Penetration with "Product 2" is almost as fast as in reference experiments, using pure starch solution. Penetration speed is preferably fast enough in size press application to allow high enough pick-up in short dwell time. Good penetration is advantageous for obtaining SCT-strength and Z-directional tensile or Scott bond strength.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A water-soluble polymer composition obtained by polymerizing in an aqueous polymerization medium, which comprises:
   degraded starch;
   at least following monomers:
   acrylamide and/or methacrylamide; and
   >2 mol-% of at least one unsaturated mono- or dicarboxylic acid(s) or salts thereof;
   wherein the polymer composition has an anionic net charge at pH 7 a dry solids content of >5 weight-%, and a viscosity in a range of 50-1500 mPas, measured at 10-with % solids concentration, at 25° C., pH 4, using Brookfield DV1 viscometer.

2. The polymer composition according to claim 1, wherein the polymer composition has an anionic net charge in the range of −0.5--2.5 meq/g at pH 7.

3. The polymer composition according to claim 1, wherein the degraded starch is degraded cationic starch or degraded non-ionic starch.

4. The polymer composition according to claim 3, wherein the degraded starch is degraded cationic starch, which has a degree of substitution DS in the range of 0.015-0.2.

5. The polymer composition according to claim 1, wherein the degraded starch solution has a viscosity in the range of 3-100 mPas, measured at 10 weight-% solids concentration, at 60° C., with Brookfield DV1 viscometer.

6. The polymer composition according to claim 1, wherein the amount of the at least one unsaturated mono- or dicarboxylic acid or a salt thereof is 3-30 mol-%, calculated from total monomer content.

7. The polymer composition according to claim 1, wherein the polymer composition is obtained by polymerizing (meth)acrylamide and at least one unsaturated mono- or dicarboxylic acid or a salt thereof selected from the group of acrylic acid, maleic acid, fumaric acid, itaconic acid, aconitic acid, mesaconic acid, citraconic acid, crotonic acid, isocrotonic acid, angelic acid, tiglic acid, and any salt thereof.

8. The polymer composition according to claim 1, wherein the aqueous polymerization medium comprises one or more initiators, and the total amount of used initiator(s) is at most 0.9 weight-%, based on the amount of the monomers.

9. The polymer composition according to claim 1, wherein the polymer composition has a cationic charge density of 0.02-0.3 meq/g at pH 2.7.

10. The polymer composition according to claim 1, wherein the polymer composition is obtained by solution polymerization or gel polymerization.

11. The polymer composition according to claim 10, wherein the polymer composition is obtained by solution polymerization and has a dry solids content of 10-30 weight %.

12. The polymer composition according to claim 11, wherein the amount of degraded starch in the polymer composition is in a range of 1-50 weight-%, calculated from the total dry solids of the composition.

13. The polymer composition according to claim 11, wherein the polymer composition has a viscosity in a range of 60-400 mPas, measured at 10 weight-% solids concentration, at 25° C., pH 4, using Brookfield DV1 viscometer.

14. A method of surface sizing paper or board, the method comprising a step of adding the polymer composition according to claim 1 on a surface of the paper, or board.

15. The method according to claim 14, wherein the board is liner, fluting, folding boxboard (FBB), white lined chipboard (WLC), solid bleached sulphate (SBS) board or solid unbleached sulphate (SUS) board.

16. The method according to claim 14, wherein the board has a grammage from 60 to 500 g/m$^2$.

17. A surface size composition for application on a surface of paper, or board comprising:
 0.5-10 weight-%, of the polymer composition according to claim 1, and
 starch, wherein
the surface size composition having a solids content of 0.5-25 weight-%.

18. The surface size composition according to claim 17, wherein the size composition has a viscosity in a range of 3-50 mPas measured at 60° C. by using Brookfield DV1 viscometer.

\* \* \* \* \*